United States Patent
Kelley et al.

(10) Patent No.: US 10,863,812 B2
(45) Date of Patent: Dec. 15, 2020

(54) MAKEUP COMPACT WITH EYE TRACKING FOR GUIDANCE OF MAKEUP APPLICATION

(71) Applicant: L'OREAL, Paris (FR)

(72) Inventors: Maya Kelley, Paris (FR); Richard Besen, Paris (FR)

(73) Assignee: L'OREAL, Paris (FR)

( * ) Notice: Subject to any disclaimer, the term of this patent is extended or adjusted under 35 U.S.C. 154(b) by 245 days.

(21) Appl. No.: 16/038,906

(22) Filed: Jul. 18, 2018

(65) Prior Publication Data
US 2020/0022478 A1    Jan. 23, 2020

(51) Int. Cl.
G06K 9/00 (2006.01)
A45D 33/00 (2006.01)
A45D 33/26 (2006.01)
G06F 3/01 (2006.01)

(52) U.S. Cl.
CPC .......... A45D 33/008 (2013.01); A45D 33/26 (2013.01); G06F 3/013 (2013.01); A45D 2033/001 (2013.01); A45D 2200/00 (2013.01)

(58) Field of Classification Search
CPC combination set(s) only.
See application file for complete search history.

(56) References Cited

U.S. PATENT DOCUMENTS

| | | |
|---|---|---|
| 7,146,184 B1 | 12/2006 | Tsitsiashvili |
| 7,522,344 B1 | 4/2009 | Curatu et al. |
| 9,110,504 B2 | 8/2015 | Lewis et al. |
| 9,489,739 B2 | 11/2016 | Kruglick |
| 9,674,485 B1 | 6/2017 | Sugaya |
| 9,684,374 B2 | 6/2017 | Starner et al. |
| 9,692,864 B1 | 6/2017 | Arikat |
| 9,952,666 B2 | 4/2018 | Sztuk et al. |
| 2003/0041871 A1* | 3/2003 | Endo ............... H04N 7/144 132/301 |
| 2011/0228155 A1* | 9/2011 | Lee ............... H04N 5/23293 348/333.01 |

(Continued)

FOREIGN PATENT DOCUMENTS

| | | |
|---|---|---|
| WO | 93/20499 | 10/1993 |
| WO | 2012/162204 A2 | 11/2012 |

(Continued)

OTHER PUBLICATIONS

International Search Report dated Oct. 31, 2019 in PCT/US2019/042434, 14 pages.

*Primary Examiner* — Alex Kok S Liew

(74) *Attorney, Agent, or Firm* — Oblon, McClelland, Maier & Neustadt, L.L.P.

(57) ABSTRACT

The present disclosure relates to a system for confident daily make-up application comprising a makeup compact and a client device. The system may be applied to specific facial features or entire faces for a complete style. The client device is configured to provide an interactive user experience by displaying templated instructions for makeup application. Templated instructions provide a 'paint-by-numbers' approach to daily makeup application. In an embodiment, the present disclosure further relates to an eye tracking feature enabling adjustment of a display projection responsive to eye position and eye status (e.g. opened or closed).

20 Claims, 15 Drawing Sheets

(56) References Cited

U.S. PATENT DOCUMENTS

| | | |
|---|---|---|
| 2015/0009334 A1* | 1/2015 | Kwon .................... H04N 5/332 |
| | | 348/164 |
| 2015/0309570 A1 | 10/2015 | Lankford et al. |
| 2016/0042224 A1* | 2/2016 | Liu ........................ G06K 9/033 |
| | | 382/203 |
| 2017/0115742 A1 | 4/2017 | Xing et al. |
| 2017/0185365 A1 | 6/2017 | Sugaya |
| 2017/0348982 A1 | 12/2017 | Wong et al. |
| 2018/0052514 A1 | 2/2018 | Liu et al. |
| 2018/0052515 A1 | 2/2018 | Wanner et al. |
| 2018/0068449 A1 | 3/2018 | Malaika et al. |

FOREIGN PATENT DOCUMENTS

| | | |
|---|---|---|
| WO | 2016/018488 A2 | 2/2016 |
| WO | 2016/073131 A1 | 5/2016 |
| WO | 2016/111875 A1 | 7/2016 |
| WO | 2017/216273 A1 | 12/2017 |

* cited by examiner

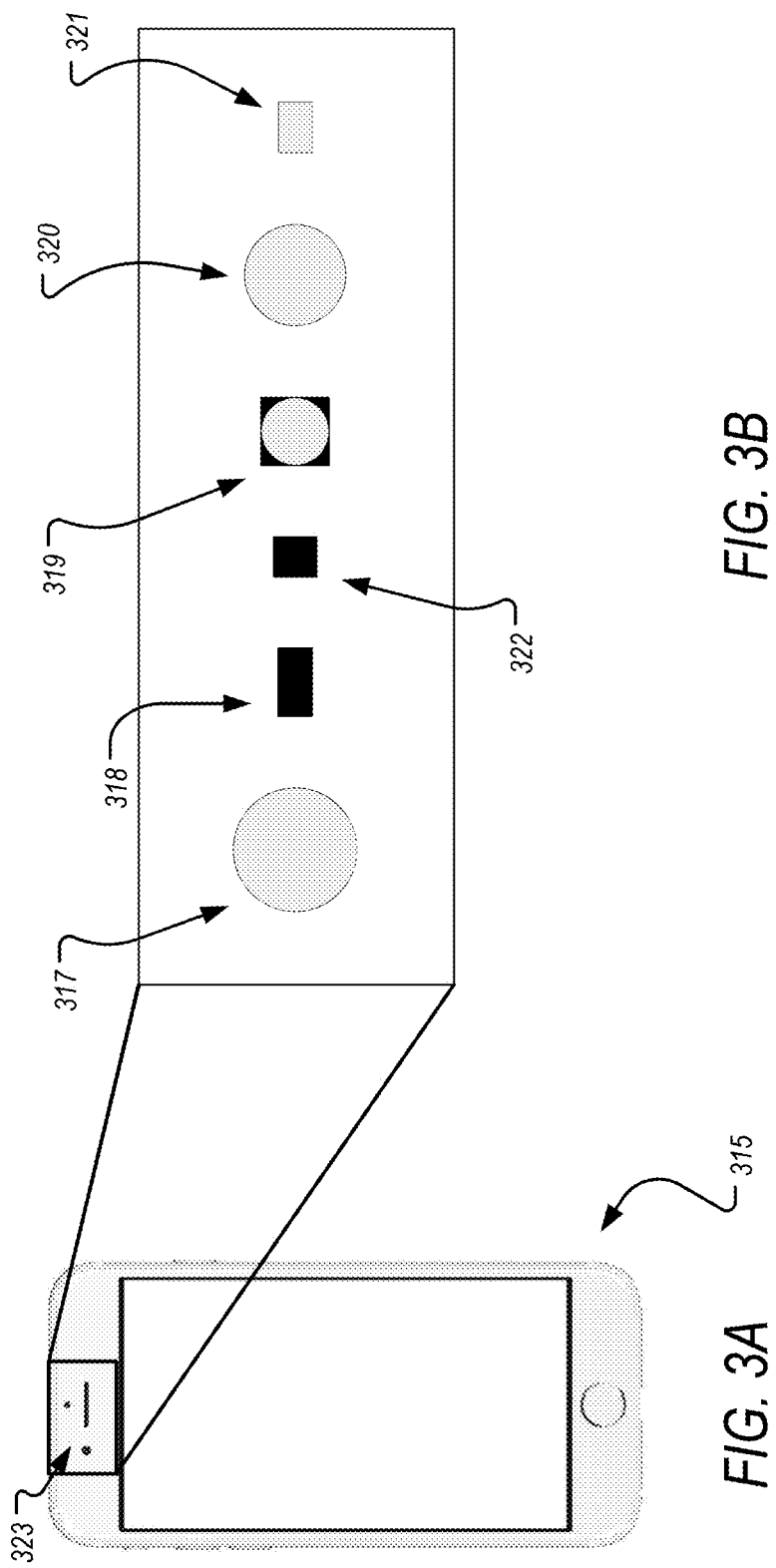

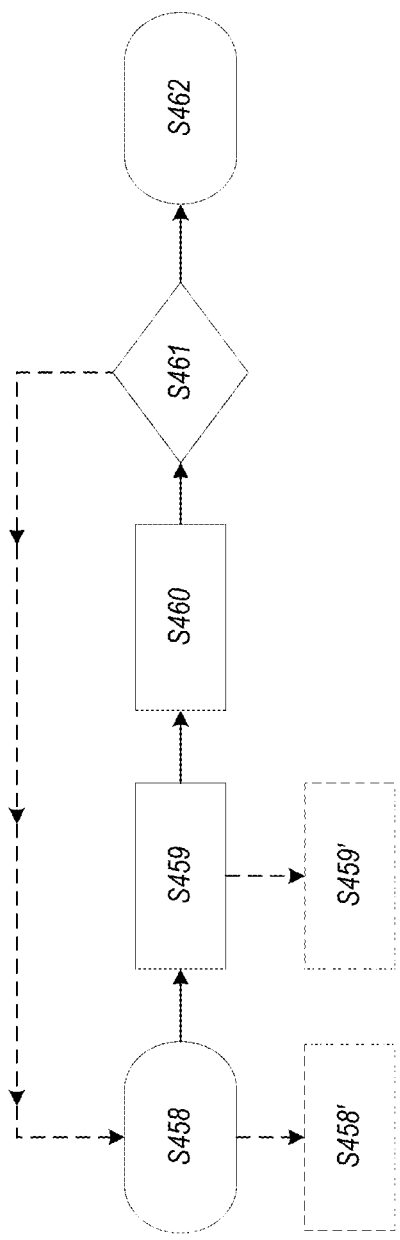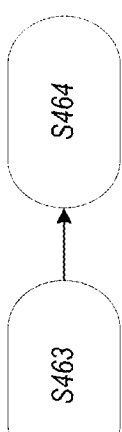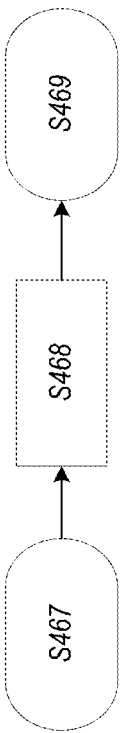
FIG. 4B
FIG. 4C
FIG. 4D
FIG. 4E

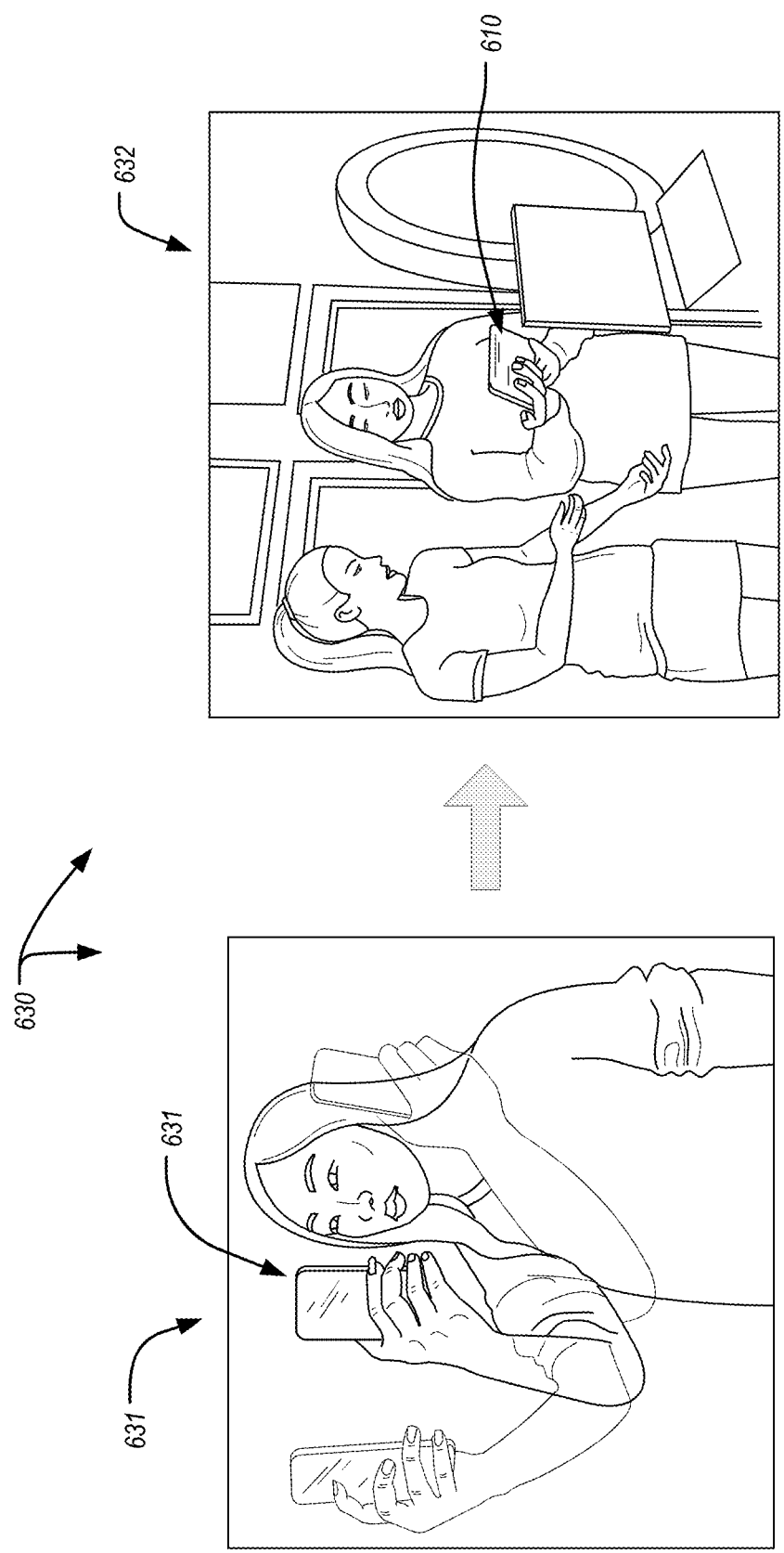

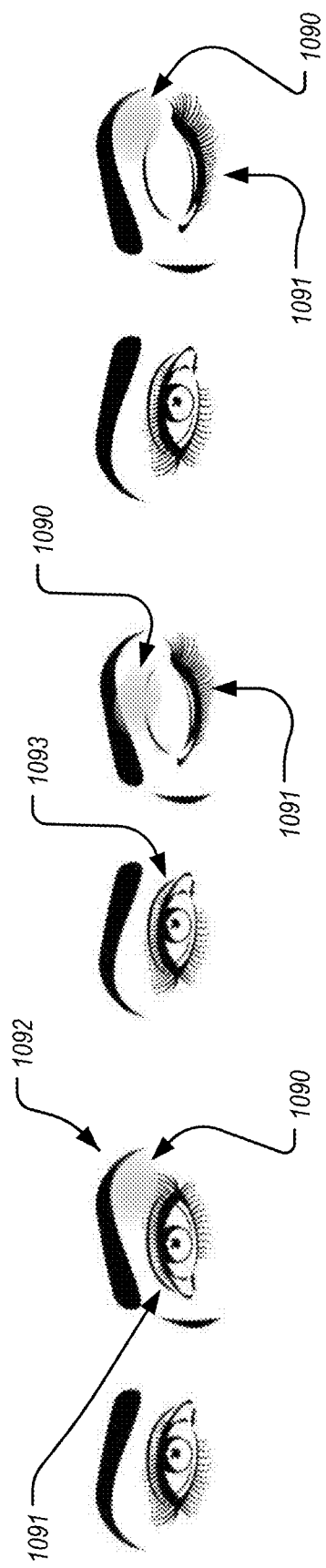

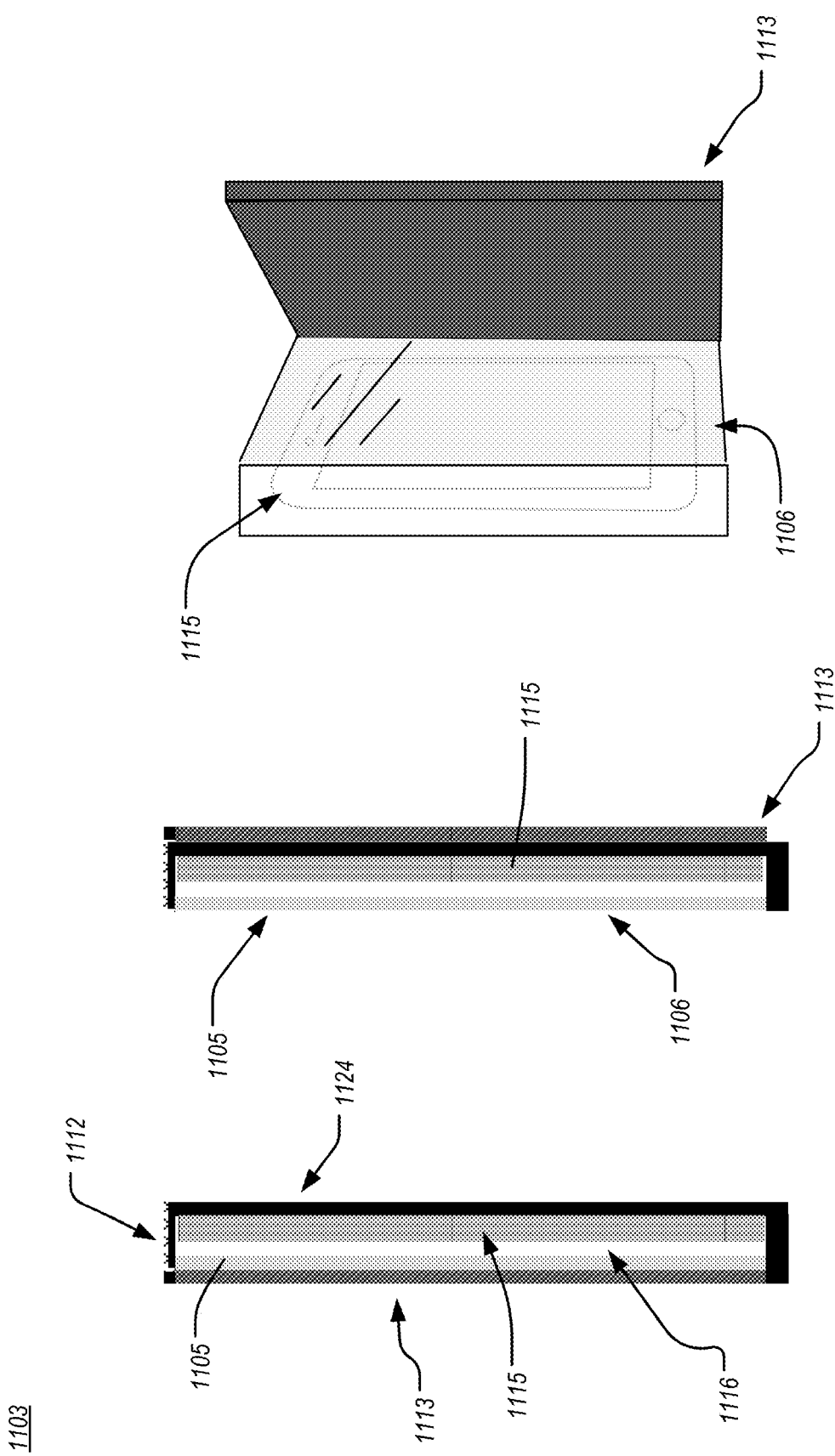

# MAKEUP COMPACT WITH EYE TRACKING FOR GUIDANCE OF MAKEUP APPLICATION

BACKGROUND

Field of the Disclosure

The present disclosure relates to a system that provides coaching during makeup application.

Description of the Related Art

While consumers aspire to recreate the looks of celebrities, a lack of formal training often limits the complexity of cosmetic techniques that may be attempted. For many, particularly beauty enthusiasts, video tutorials are an accessible and instructive way to discover and learn looks. This experience, however, is not easily translated to a daily routine where time is limited and efficiency is paramount. The tedium therein leaves consumers with few choices for efficient and confident makeup application of new styles in a daily routine.

Recent developments promise to utilize mobile devices in improving makeup application as part of a daily routine, providing video tutorials in an efficient manner. Important to consumer adoption of mobile devices in a daily cosmetic routine, however, is the ability of instructions displayed on-screen to track the movements of the user and be presented without disorientation during cosmetic application. To this end, a portable, user-friendly makeup application system capable of displaying user-centric instructions, thus making possible complex techniques for daily use, has yet to be developed.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

According to an embodiment, the present disclosure is related to an apparatus, comprising a semi-transparent surface that is reflective on at least one side, and a support configured to hold a client device having a display and one or more sensors, wherein the semi-transparent surface overlays the display and allows a visual object displayed on the display to be visible on the reflective side of the semi-transparent surface while the reflective side simultaneously shows a reflection of a user viewing the reflective side, and wherein the one or more sensors are configured to acquire data related to a characteristic of at least one eye of the user.

According to an embodiment, the present disclosure is further related to a method for adjusting a displayed visual object, comprising acquiring, via processing circuitry, data related to a characteristic of at least one eye of a user, and adjusting, via the processing circuitry, the displayed visual object based upon the acquired data related to the characteristic of the at least one eye of the user, wherein the displayed visual object is displayed on a semi-transparent surface that is reflective on at least one side, the displayed visual object being visible on the reflective side of the semi-transparent surface, the reflective side simultaneously showing a reflection of the user viewing the reflective side, wherein the data related to the characteristic of the at least one eye of the user is acquired via one or more sensors of a client device having a display, the client device being held by a support.

According to an embodiment, the present disclosure is further related to a non-transitory computer-readable storage medium storing computer-readable instructions that, when executed by a computer having a processing circuitry, cause the computer to perform a method for adjusting a displayed visual object, the method for adjusting the displayed visual object comprising acquiring data related to a characteristic of at least one eye of a user, and adjusting the displayed visual object based upon the acquired data related to the characteristic of the at least one eye of the user, wherein the displayed visual object is displayed on a semi-transparent surface that is reflective on at least one side, the displayed visual object being visible on the reflective side of the semi-transparent surface, the reflective side simultaneously showing a reflection of the user viewing the reflective side, wherein the acquired data related to the characteristic of the at least one eye of the user is acquired via one or more sensors of a client device having a display, the client device being held by a support.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3A is an exemplary embodiment of a client device;

FIG. 3B is a schematic of client device-based sensors, according to an exemplary embodiment;

FIG. 4B is a sub flowchart of sensing and evaluation, according to an exemplary embodiment;

FIG. 4C is a sub flowchart of sensing and evaluation, according to an exemplary embodiment;

FIG. 4D is a sub flowchart of sensing and evaluation, according to an exemplary embodiment;

FIG. 4E is a sub flowchart of sensing and evaluation, according to an exemplary embodiment;

FIG. 6A is an illustration of the flowchart of user experience during an onboarding portion of a coaching session, according to an exemplary embodiment;

FIG. 10A is an illustration of an aspect of the flowchart of the eye tracking feature of the system, according to an exemplary embodiment of the present disclosure;

FIG. 10B is an illustration of an aspect of the flowchart of the eye tracking feature of the system, according to an exemplary embodiment of the present disclosure;

FIG. 10C is an illustration of an aspect of the flowchart of the eye tracking feature of the system, according to an exemplary embodiment of the present disclosure;

FIG. 11A is a cross-sectional schematic of a naked coach system, according to an exemplary embodiment of the present disclosure;

FIG. 11B is a cross-sectional schematic of a naked coach system, according to an exemplary embodiment of the present disclosure;

FIG. 11C is a perspective view of a naked coach system, according to an exemplary embodiment of the present disclosure;

DETAILED DESCRIPTION

The present disclosure addresses the need for a portable and user-friendly daily makeup application system that makes it possible for users to confidently apply, reproduce, wear, and the like, new makeup styles. Moreover, the present disclosure provides enhanced instruction via implementation of eye tracking features. Ultimately, by integrating a makeup compact with a client device, including client device-based software, and paint-by-numbers approach, and the like, the present disclosure provides consumers a confident, convenient experience for daily experimentation with, and mastering of, new techniques. The system described herein aims to accomplish one or more of the following:

Provide a personalized user experience through capture of user facial features, including eye position and eye status, color and tone using client device-based sensors.

Present a catalog of learnable techniques and styles according to the available color palette.

Allow user experimentation via user-directed coaching modules.

Limit tactile interaction with the client device by enabling audible command of the progression of the instructional unit.

Improve user mastery of techniques through feedback and coaching according to data received and processed from client device-based sensors.

Encourage users to discover new looks via integration with user social media presence.

Figure 1:
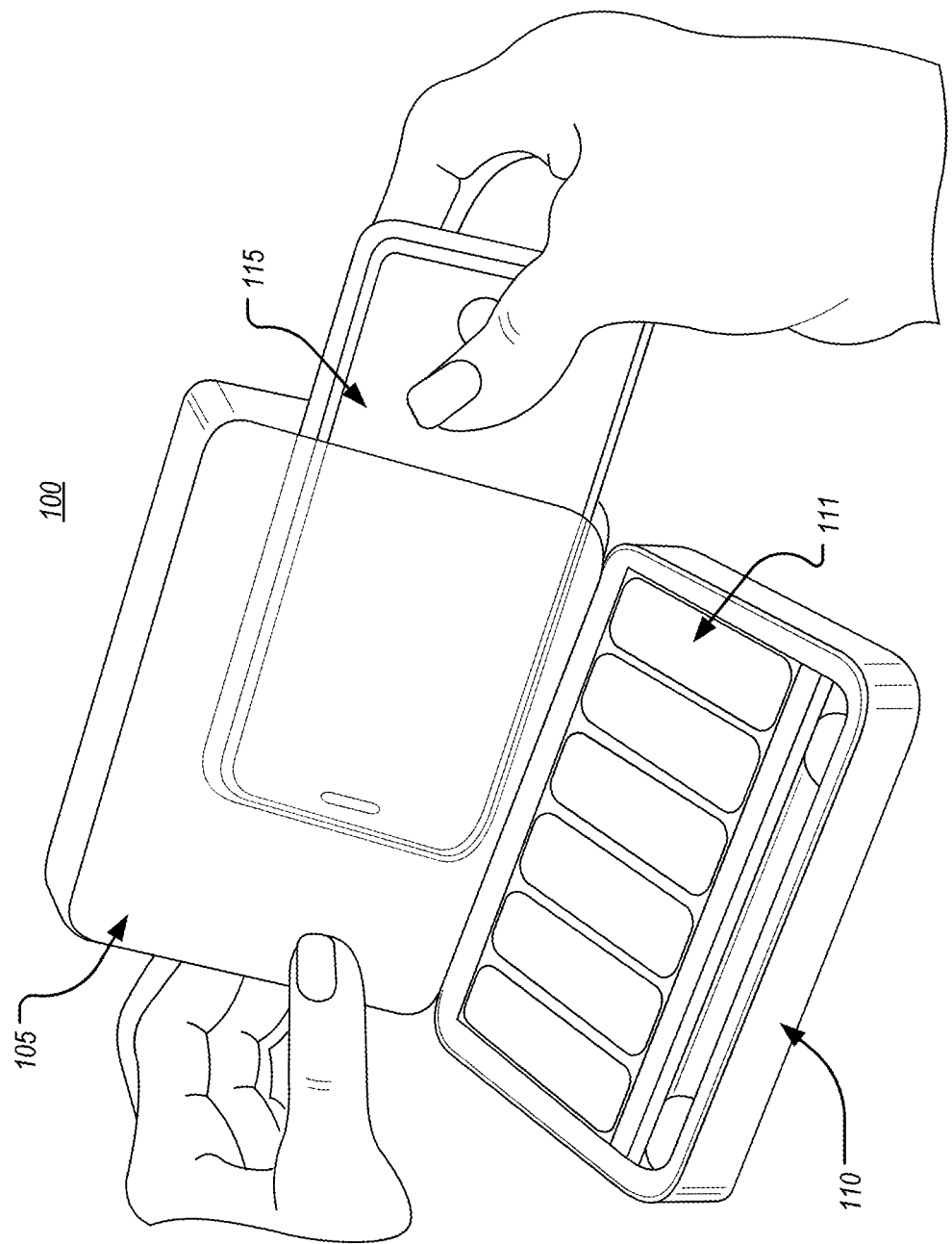
FIG. 1 is an exemplary illustration of the system of the present disclosure in a consumer environment, comprising a client device and a makeup compact.

FIG. 1 is an exemplary illustration of the system of the present disclosure in a consumer environment. In an embodiment, the system 100 comprises a client device 115 and a makeup compact 110. A semi-transparent display 105 is disposed on the makeup compact 110, creating a partition between the client device 115 and the makeup compact color palette 111. In an embodiment, the client device 115 is a smartphone equipped with a collection of sensors for capturing a variety of characteristics of objects within a field of view. The makeup compact 110 includes one or more cosmetics, according to the color palette 111 desired by the user. The type of makeup available to the user is registered with the client device-based software to improve potential style recommendations to the user.

In an embodiment, a sensor component including one or more sensors is operably coupled to a client device 115 via a port. In an embodiment, a sensor component including one or more sensors is operable to detect (e.g., assess, calculate, evaluate, determine, gauge, measure, monitor, quantify, resolve, sense, and the like) information related to the characteristic of an at least one eye of a user. Non-limiting examples of the one or more sensors include acoustic sensors, cameras, charge-coupled devices (CCDs), complementary metal-oxide-semiconductors (CMOS) devices, electromagnetic energy sensors, image sensors, infrared sensors, optical recognition sensors, optical sensors, photodiode arrays, radio frequency components sensors, thermosensors, transducers, and the like, or combinations thereof.

In an embodiment, a sensor component is operably coupled to a client device 115 via a USB (Universal Serial Bus) port. In an embodiment, a sensor component is operably coupled (e.g., capacitively coupled, communicatively, electrically, electromagnetically, inductively, magnetically, optically, ultrasonically, wirelessly, and the like) to client device 115. In an embodiment, a remotely located sensor component is operably coupled via wireless communication to the client device 115.

Figure 2A:
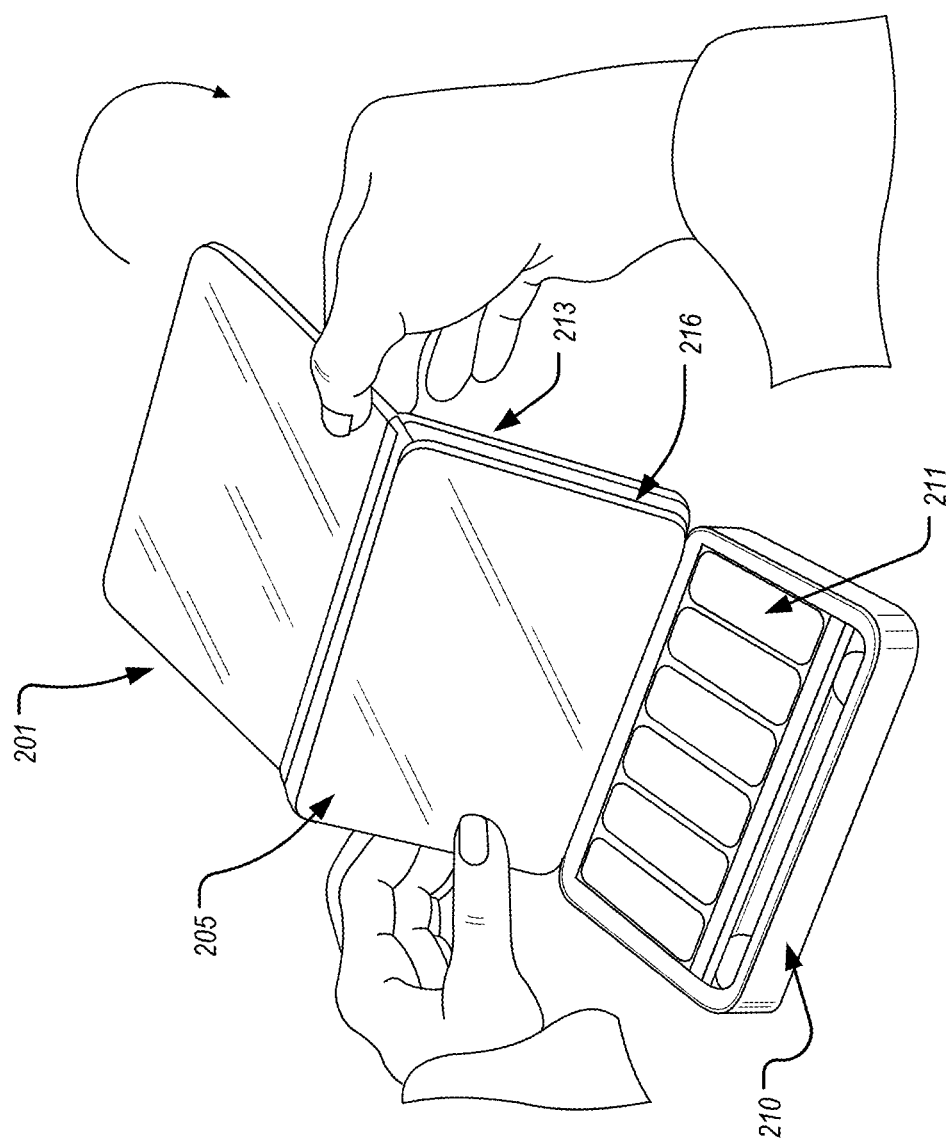
FIG. 2A is an exemplary illustration of the makeup compact of the present disclosure.

FIG. 2A is an exemplary illustration of the makeup compact of the present disclosure. In an embodiment, the makeup compact 210 includes a color palette 211 comprising one or more cosmetics. When desired, the makeup compact 210 functions in a standard embodiment as a mirror, wherein the upper lid 213 of the makeup compact and the protective cover 201 are lifted and the semi-transparent display 205 is presented to the user. In an embodiment, the semi-transparent display 205 is a one-way mirror. In the absence of a light-emitting client device within the client device housing 216, the semi-transparent display 205 functions as a standard mirror from the perspective of the user. To implement the interactive user interface of the client device, the client device, with activated coaching module, is positioned within the client device housing 216. From the user's perspective, both a mirror reflection of the user and client device-generated objects will be visible simultaneously on the semi-transparent display 205. In an embodiment, a distance between the upper lid 213 of the makeup compact 210 and the semi-transparent display 205 is pre-determined according to the dimensions of a client device. In an embodiment, the client device is a smartphone of the kind typified by an Apple iPhone®.

Figure 2B:
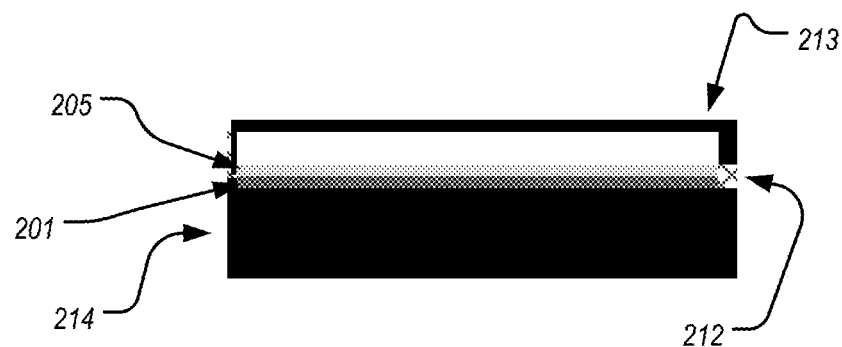
FIG. 2B is a an aspect of a step-wise schematic of the makeup compact and client device and the progression from protective cover to interactive semi-transparent display with client device.
Figure 2C:
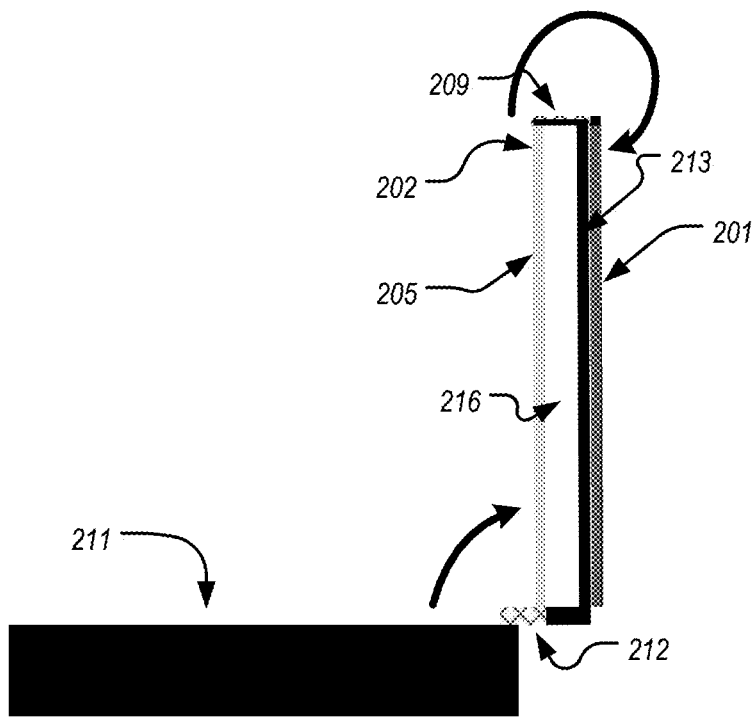
FIG. 2C is an aspect of a step-wise schematic of the makeup compact and client device and the progression from protective cover to interactive semi-transparent display with client device.
Figure 2D:
FIG. 2D is an aspect of a step-wise schematic of the makeup compact and client device and the progression from protective cover to interactive semi-transparent display with client device.

FIG. 2B, FIG. 2C, and FIG. 2D are step-wise schematics of a makeup compact 210 and a client device and the progression from protective cover to interactive semi-transparent display with client device. In FIG. 2B, the makeup compact 210 is in a closed position, with a protective cover 201 and a semi-transparent display 205 seated against the body 214 of the makeup compact 210. A flexible hinge 212 connects the upper lid 213 of the makeup compact 210 to the body 214 of the makeup compact 210. In FIG. 2C, a user lifts the upper lid 213 of the makeup compact to expose the protective cover 201 to the user. The upper lid 213 of the makeup compact may be rotated about the flexible hinge 212. The protective cover 201 may then rotated about the flexible hinge 209 and the semi-transparent display 205 may be exposed to the user. In an embodiment, the semi-transparent display 205 is designed to function as a standard mirror in the absence of a client device 215 within the client device housing 216, as the functionality of the semi-transparent display 206 is realized only when a light source is present in the client device housing 216. In the absence of a client device, the semi-transparent display 205 can be used by the user in tandem with the makeup color palette 211 as a standard mirror. When an interactive user experience is desired a client device can be positioned within the client device housing 216, as described in FIG. 2D. A client device 215 is inserted into the client device housing 216 disposed between the semi-transparent display 205 and the upper lid 213 of the makeup compact. In an embodiment, the client device housing 216 is constructed with a depth pre-determined to accommodate a specific design of client device 215, such as an Apple iPhone®. In an embodiment, the client device housing 216 is constructed with a depth pre-determined to accommodate a universal design of client device 215, where the pre-determined depth is a known depth and is integrated within client device-based software to generate appropriate display objects on a display surface 206 of the semi-transparent display 205.

In an embodiment, the semi-transparent display 205 is fabricated such that transduction of tactile user commands to client device-based software can be performed. Non-limiting examples of tactile input detection include resistance, capacitance, infrared grid, surface acoustic wave, and acoustic pulse recognition, and may be integrated within the client device-based software to receive user commands.

In an embodiment, a protective screen-like touch sensitive film enables tactile sensing between the client device 215 and the semi-transparent display 205.

In an embodiment, one or more buttons disposed through the thickness of the semi-transparent display 205 allow direct user interaction with the client device 215.

In an embodiment, client device-based sensors can detect commands from the user, including hand gestures, voice commands, and the like.

FIG. 3A is an exemplary embodiment of a client device. According to an embodiment, the client device 315 is a smartphone, including front-facing sensors 323 in addition to features of a smartphone considered to be standard (e.g. microphone, speakers), of the kind typified by an Apple iPhone®. FIG. 3B is a schematic of these client device-based sensors, according to an exemplary embodiment. In an embodiment, the front-facing sensors 323 of the client device 315 include one or more of an infrared camera 317, an infrared flood illuminator 318, a proximity sensor 322, a dot projector 319, a visible light camera 320, a visible light flood illuminator 321, and the like. The combination of the abovementioned front-facing sensors 323 allows for capture and recreation of realistic three-dimensional models of a user's facial features, skin color, and tone. Such depth-dependent digitization of the face is understood in the art, as evidenced by U.S. Pat. No. 9,582,889 B2, which is incorporated herein by reference. In an embodiment, recognition of the facial features is performed via digital reconstruction of two-dimensional images acquired from a visible light camera.

According to an exemplary embodiment of the present disclosure, the above-described front-facing sensors 323 of the client device 315, and the infrared camera 317 and infrared flood illuminator 318, in particular, are employed for eye tracking. Briefly, infrared light projected from the infrared flood illuminator 318 is reflected by a left eye or a right eye of a user and collected by the infrared camera 317. Reflected, collected infrared light is processed via client device-based software, or via remotely located processing circuitry, in order to determine point of gaze, eyelid position (or eye aperture), motion of the left eye or the right eye relative to the head, pupil dilation, or a combination thereof. Details of the eye tracking feature of the present disclosure, including implementations within a coaching module of the present disclosure, are further described below.

Figure 4A:
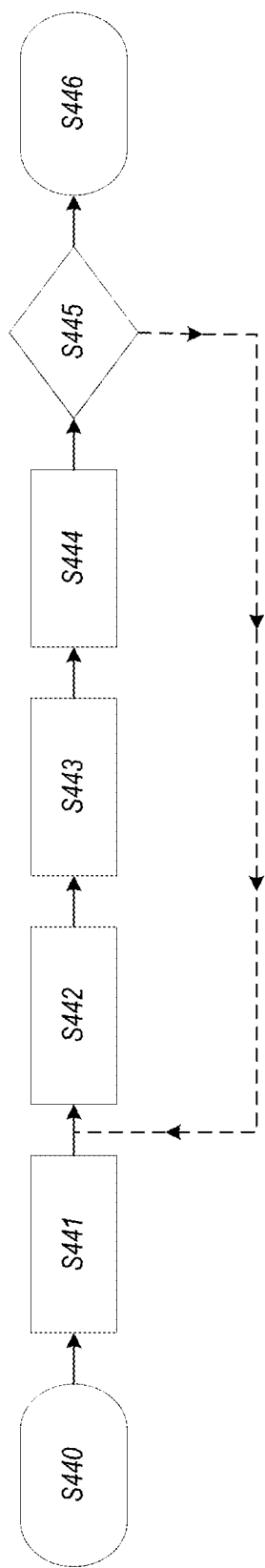
FIG. 4A is a flowchart of sensing and evaluation of sensor inputs during a coaching module, according to an exemplary embodiment.

FIG. 4A is a flowchart of sensing and evaluation of sensor inputs during a coaching module, according to an exemplary embodiment. Following user selection of the desired look, the client device prompts the user to place the client device horizontally, or vertically, within the client device housing of the makeup compact. Utilizing client device-based sensors (e.g. proximity sensor), the client device-based software determines the presence of the client device within the client device housing and initiates the instructional unit when the client device is in place S440. In order to provide an accurate display projection of the templated shapes of the instructional unit relative to the user, client device-based sensors are further utilized to locate, capture, and digitize a real time rendering of the user S441. These data are integrated with the user selected exercise to generate a display projection that illuminates a surface of the semi-transparent display, thus depicting spatially accurate templated shapes to the user via the semi-transparent display.

In an embodiment, the display projection is generated to appear similar to a reflection of the user. Client device-based software receives data from client device-based sensors related to the depth, position, and orientation of the user to determine the position of the user relative to the semi-transparent display. This relationship, in the context of the pre-determined distance between the client device and the semi-transparent display, allows for the rendering of a mirror-like reflection onto the semi-transparent display. Understanding this relationship allows user movements to be reacted to, such as translating an image to the left when the user moves to the right or scaling the image larger when the user moves closer to the semi-transparent display.

In an embodiment, the display projection is responsive to eye movement and eye status of the user. Client device-based software receives data from client device-based sensors (e.g. infrared camera, dot projector) related to the position, orientation, and aperture of the eyes of the user to determine characteristics of the eyes. These characteristics allow for modification of the display projection in response to changes in eye position or eye status. For example, responsive to a user closing a left eyelid and reducing the left eye aperture to zero, the display projection is shifted, accordingly, to accommodate the shift in user perspective to the right eye, solely. Similarly, as a user moves a point of gaze, the display projection is shifted, or otherwise altered, to accommodate the change in user perspective.

According to an embodiment, as the user applies makeup the client device actively monitors user position, orientation, movement and facial features S442. In an embodiment, the client device-based sensors, controlled by client device-based software, generate data including one or more of user facial features, including eye position and eye status, user head orientation, user depth, user motion, user speed, color, tone, and the like, and store the acquired data to local storage, cloud-based storage, or a combination thereof.

Stored data is accessed during display projection of future images to improve spatial projection of templated shapes relative to prior instances S443. To this end, stored data, including that which is related to relative user position and orientation, as well as eye position and eye status, are used to predict future positions and orientations of the user so that adjustments to the display projection are more intuitive, allowing templated shapes to follow the contours, movements, and features of the user S444. For example, initially, a user is applying makeup to the right side of the face and the client device display is projecting a templated shape onto the semi-transparent display, accordingly. As the user moves the head to more easily view a section of the face, client device-based software recognizes the movement and adjusts the display projection accordingly. In an example, initially, a user is applying makeup above the right eye of the user and the client device display is projecting a templated shape onto the semi-transparent display, accordingly. As makeup application moves lower toward the eyelid of the right eye of the user, the user must close the right eye, reducing the right eye aperture to zero and switching from dual-perspective to a single perspective. As a result, client device-based software recognizes the shift to single perspective and adjusts the positioning of the templated shape or any displayed text, accordingly.

There exists, however, delay in the rendering as the client device-based software generates the display projection. With subsequent use, the client device-based software will generate a library of prior user motions that can be called upon during future instances of similar motions. In this way, as the number of instances of a certain motion and stored data increase, the client device-based software will be able to better predict the velocity and direction with which a movement is occurring, thus eliminating lag time in display projection generation.

When the user has completed an instructional unit, the user provides an audible command, visual command, tactile command, or a combination thereof indicating the motion is completed, at which point a determination is made whether additional instructional units are required to complete the coaching module S445. If additional instructional units are required, the client device-based software progresses to instruction and display projection of a templated shape S442 of the next instructional unit. If the coaching module is complete, the client device-based software proceeds to completion S446.

According to an embodiment, data generated from client device-based sensors and stored to local storage, cloud-based storage, or a combination thereof, are utilized in future coaching modules to enhance the prediction of user motion in the context of specific instructional units, thereby improving accuracy of display projections.

According to an embodiment, data generated from client device-based sensors and stored to local storage, cloud-based storage, or a combination thereof, are utilized to provide real-time feedback to the user regarding user performance in the form of visual commands, audible commands, tactile commands, or a combination thereof.

According to an embodiment, time-coarse images of the user before, during, and after makeup application are used to evaluate user performance.

In an embodiment, user performance relative to a desired result of an applied technique is incorporated into future instruction. For example, if a user selects to apply an eye makeup technique to both eyes but fails to achieve the desired result with a first eye, client device-based sensors and software will acknowledge the discrepancy and modify instruction directed to a second eye to ensure symmetry across the user's face.

FIG. 4B is a sub flowchart of initialization of a coaching module, according to an exemplary embodiment. First, client device-based sensors, including a proximity sensor, are activated by the user following selection of a coaching module S455. Next, the user is instructed to place the client device into the client device housing S456. The proximity sensor housed within the client device detects the presence of the client device housing and sends a signal to the client device-based software to begin the coaching module S457. In an embodiment, the client device and client device housing further comprise wireless identification tags. These wireless identification tags, including, among others, near field communication devices, provide a unique makeup compact identifier that would expedite the user onboarding experience, instantly identifying the available makeup palette.

FIG. 4C is a sub flowchart of receipt of sensed data and output by the client device, according to an exemplary embodiment. First, the client device-based software receives sensed data from the client-device base sensors S458 and stores it to local-based and cloud-based storage S458'. Next, the sensed data is processed by the client device-based software S459, and the processed data is stored to local-based and cloud-based storage S459'. The processed data is then analyzed by the client device-based software S460 and it is determined if an adjustment to the client device output is needed S461. If an adjustment is needed, the client device-based software modifies the client device output, accordingly S462. Otherwise, passive evaluation of the transmitted sensed data will continue. For example, the client device-based software receives sensed data relating to user position relative to the semi-transparent display from client-device based sensors S458, and stores the sensed data to local-based and cloud-based storage S458'. The sensed data is then processed by the client device-based software S459 and stored to local-based and cloud-based storage S459'. The processed data is then analyzed by the client device-based software S460 to determine if the position of the user relative to the semi-transparent display has changed S461. If it is determined that the relative position has changed, the client device-based software will modify the display projection, accordingly S462. If the relative position of the user to the semi-transparent display has not changed, passive evaluation of the transmitted sensed data will continue.

FIG. 4D is a sub flowchart of the output by the client device-based software, according to an exemplary embodiment. Following sensing, transmission, and evaluation of the sensed data, the client device-based software may determine it appropriate to modify the output of the client device S463, wherein the output of the client device includes video and audio data. For example, as a user performs a coaching module and the client device-based software receives sensed data, it may be appropriate to provide visual feedback to the user regarding the user's performance, wherein the feedback allows for self-assessment of makeup application S4645. This type of feedback may comprise side-by-side comparisons of the desired result and the user's result.

FIG. 4E is a sub flowchart of the output by the client device-based software, according to an exemplary embodiment. Following sensing, transmission, and evaluation of the sensed data, the client device-based software may determine it appropriate to modify the output of the client device S467, wherein the output of the client device includes video and audio data. As a user performs a coaching module and the client device receives sensed data, it may be appropriate to provide feedback to the user regarding the user's performance. In an embodiment, the client device provides coaching suggestions based upon an evaluation of the sensed data relative to prior instances of the sensed data or global averages of the sensed data for specific techniques S468. For example, client device-based sensor data indicates the user's head motion may be overactive during makeup application. Compared to global averages or previous instances of sensed data for the user, the client device-based software correlates poor makeup performance, compared to the projected template, with overactive head movement. In turn, the client device may provide supportive feedback to the user via video and audio output, recommending solutions to improve future user performance S469.

Figure 5:
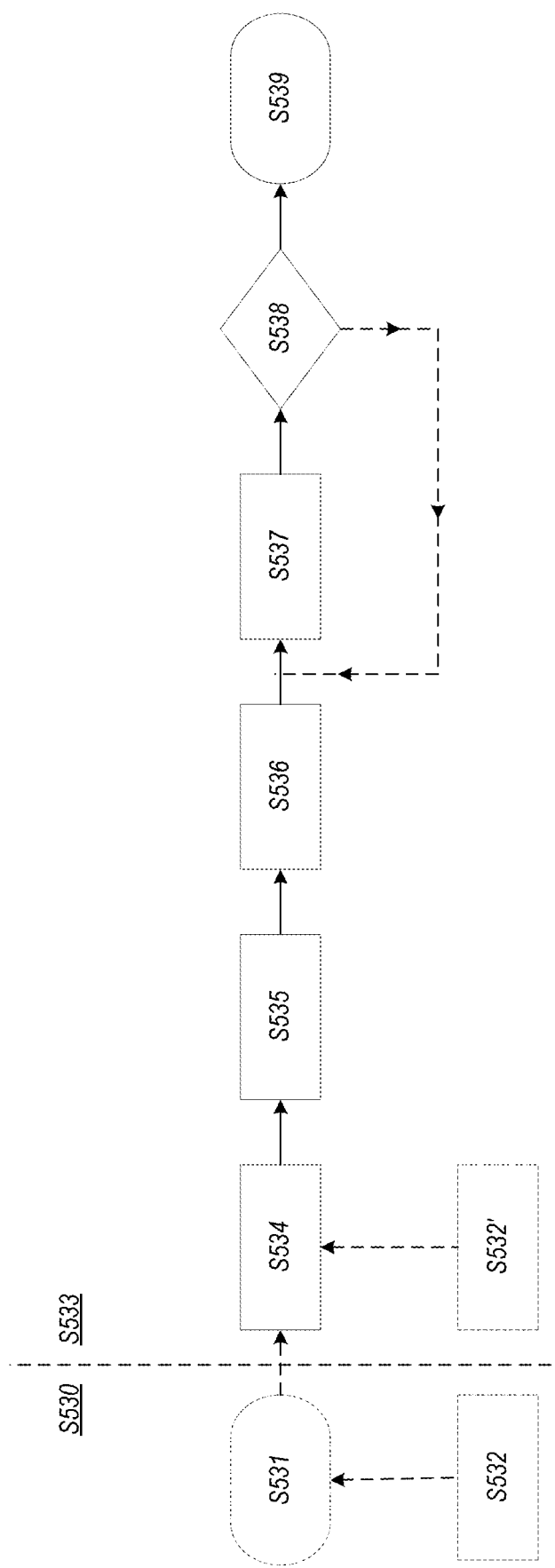
FIG. 5 is a flowchart of a user experience during a coaching session, according to an exemplary embodiment.

FIG. 5 is a flowchart of a user experience during a coaching session, according to an exemplary embodiment. During user onboarding S530, client device-based sensors are used to perform a three-dimensional digitization S531 of the facial features including the eyes, color, and tone of the user. Client device-based software then adjusts to calibrate the image and color projection according to ambient light. Next, the user selects the compact color palette available at home S532, identifying and registering this information within the client device-based software, thereby defining the scope of possible coaching modules according to the available color palette. In an embodiment, the client device-based software is further capable of exploiting collected data regarding facial features including the eyes, color and tone to recommend color palettes best suited to the user. This collected data could further include a series of lifestyle questions aimed at identifying a color palette match. If the user has available the same makeup compact, and color palette, at each training session, user profile creation is a one-time event.

Once a user profile has been created and the makeup compact has been identified and registered, everyday coaching may begin S533. First, a user selects a makeup coaching module S534. For example, the user may select a specific style or look of interest. Alternatively, client device-based software may intelligently offer occasion-based inspirations that complement the user.

In an embodiment, the client device-based software may offer a variety of styles including, for example, everyday office, first date, movie night, and fine dining. For each occasion, a style or look is offered to the user. To this end, client device software may also incorporate social media content associated with the user's user profile to better inform and predict styles of interest to the user based upon preferences indicated within the user's social media presence.

In an embodiment, augmented reality capabilities enable the user to realize a look prior to look selection. Utilizing client device-based sensors, the client device utilizes prior and active depth mapping, including light filtering, to provide a realistic rendering of what a style may look like on a user.

According to an embodiment, the user may indicate at this step that a color palette other than the color palette indicated at user profile creation is in use S532'. The client device-based software will adjust recommended occasion-based looks accordingly and present them to the user for look selection.

Following user selection of the desired coaching module, the user is prompted by the client device-based software to insert the client device horizontally, or vertically, into the client device housing within the makeup compact and manipulate the upper lid and protective cover until the semi-transparent display is visible. When positioned, the client device-based sensors (e.g. proximity sensor) perceive the location of the client device relative to the makeup compact and initiate an instructional unit of the coaching module S536. An instructional unit includes, among others, video tutorials, projection of templated shapes, or a combination thereof. Next, user controlled step-by-step makeup application steps are projected from the client device display and are visible through the semi-transparent display S537. A video tutorial of a first step of the instructional unit is displayed. Following the video tutorial, the appropriate templated shapes are projected onto the semi-transparent display. As the user completes each makeup application step according to the templated shapes projected from the client device display, the user indicates as much to the client device-based software via audible command, visual command, tactile command, or a combination thereof. If additional steps are required to complete the instructional unit (e.g. if the instructional unit requires makeup application of more than one cosmetic) S538, the instructional unit begins the next step, including the next step of the video tutorial and the appropriate templated shapes. If no additional steps are required S538, makeup application of the current instructional unit has ended. If additional instructional units are required to complete the coaching module (e.g. if the coaching module is a full face style compared to eye style only, or if the coaching module is a two eye style compared to a one eye style only) S538, the coaching module begins the next instructional unit. If no additional instructional units are required S538, makeup application has ended and the client device-based software returns to a home menu.

In an embodiment, the client device-based software utilizes data from client device-based sensors to evaluate user performance and to provide feedback for improvement of makeup application. Feedback may be audible feedback, visual feedback, tactile feedback, or a combination thereof.

In an embodiment, the client device-based software is connected to third party applications including, for example, social media platforms, allowing the user to promote a style or look amongst a social network. Moreover, publishing results to a social network permits social feedback beyond the technical feedback provided by the client device-based software.

In an embodiment, the client device-based software predicts future styles and looks of interest to the user and recommends products related to the realization of those styles and looks.

According to an embodiment, the makeup compact does not include a semi-transparent display and user commands and user prompts are provided directly from the client device display.

FIG. 6A is an illustration of the flowchart of user experience during an onboarding portion of a coaching session, according to an exemplary embodiment. During user onboarding 630, client device-based sensors are used to perform a three-dimensional digitization 631 of the facial features including the eyes, color, and tone of the user. To do this, the user is instructed to hold and move the client device 615, or smartphone, at positions relative to their face to fully capture three-dimensional facial features and, in particular, depth mapping. For example, full captured three-dimensional facial features may include an interpupillary distance. Client device software then adjusts to calibrate the image and color projection according to ambient lighting. Next, the user selects the makeup compact 610, including color palette, available at the home, identifying and registering this information within the client device-based software. This identification and registration of the available makeup compact and color palette defines the scope of possible styles and looks. If the same makeup compact and color palette is available to the user at each coaching session, user profile creation, wherein the makeup compact and color palette are identified and registered, is a one-time event.

Figure 6B:
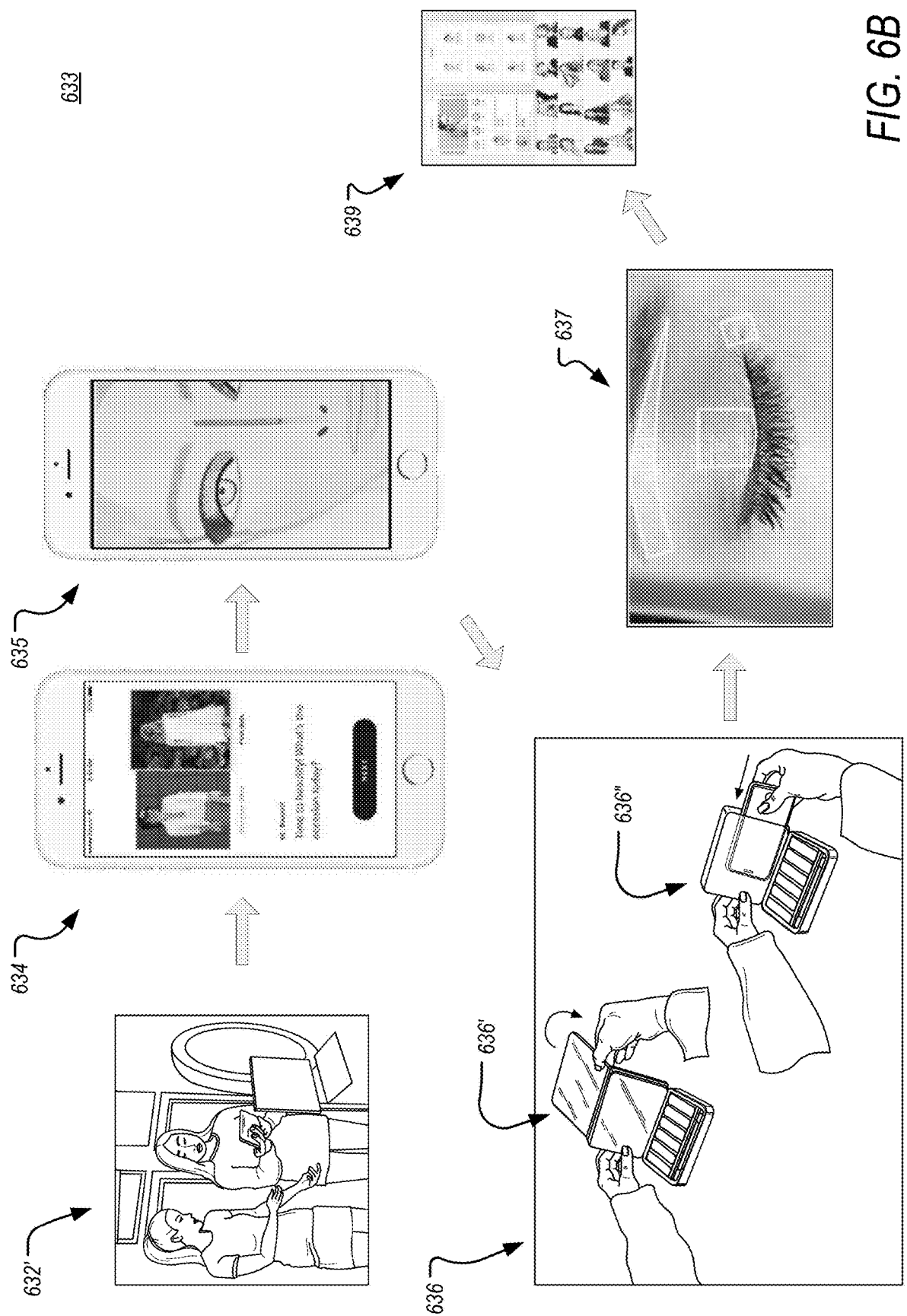
FIG. 6B is an illustration of the flowchart of user experience during a makeup application module of a coaching session, according to an exemplary embodiment.

Once a user profile has been created and makeup compact and color palette have been identified and registered, everyday training may begin 633. FIG. 6B is an illustration of the flowchart of user experience during a makeup application module of a coaching session, according to an exemplary embodiment. First, a user confirms that that the makeup compact and color palette currently available are the same as that which was identified and registered during user profile creation 632'. If this is not the case, the new makeup compact and color palette can be identified and registered to inform the client device-based software of the available styles and techniques. Next, the user selects a desired makeup style or look 634. For example, this may be based upon an upcoming event or specific occasion. The client device-based software can also intelligently offer occasion-based inspirations that complement the user.

In an embodiment, the client device-based software may offer a variety of styles including, for example, everyday office, first date, movie night, and fine dining. For each occasion, a style or look is offered to the user. To this end, client device software may also incorporate social media content associated with the user's user profile to better inform and predict styles of interest to the user based upon preferences indicated within the user's social media presence.

To aid the user in style and look selection, augmented reality capabilities enable the user to realize a style prior to look selection. Utilizing client device-based sensors, the client device utilizes prior and active depth mapping, including light filtering, to provide a realistic rendering of what a style may look like on a user 635.

Following user selection of the desired style or look, the client device-based software prompts the user to insert the client device into the client device housing 636. The user lifts and rotates the protective cover to expose the semi-transparent display residing underneath 636'. The client device is then inserted into the client device housing and positioned wherein the semi-transparent display is between the user and the client device 636". Upon proper seating, client device-based sensors perceive co-location of the client device with the makeup compact and initiate the instructional unit. The client device-based software then begins playing a first video tutorial of the instructional unit and then projecting templated shapes from the client device display 637. These templated shapes, indicated by white outlined objects in FIG. 6B, are customized to the facial features of the user and are presented similarly to a "paint-by-numbers" approach, wherein each shape corresponds to a specific makeup cosmetic. Following completion of each step in an instructional unit by the user, the user indicates to the client device-based software via verbal command, visual command, tactile command, or a combination thereof, that the current step is completed. If additional steps in the instructional unit, or additional instructional units in the coaching module, are required, the coaching session proceeds to initialization of subsequent video tutorials and templated shapes. Otherwise, the coaching module, and instructional unit therein, is complete and the user is invited to favorite, share, and explore other coaching module styles and looks in a connected environment. In an embodiment, if the user is satisfied with the technique or would like to save the technique for continued coaching and improvement at a later time, the client device software allows the user to end the training and favorite the technique. In an embodiment, the client device-based software encourages the user to explore new techniques in accordance with the just completed coaching module and the social media preferences of the user. Further, the user may be invited to share the finished look on social media platforms to obtain social feedback or to purchase additional products to improve the user's abilities and performance.

In an embodiment, during the instructional unit, client device-based sensors actively monitor the performance of the user and compare output metrics to established standards for corresponding techniques. If it is determined, for example, that the user is applying the incorrect cosmetic, the client device may provide guidance and encouragement to the user via audible alerts, visual alerts, tactile alerts, or a combination thereof. The user may, in turn, respond to the alert and continue makeup application with the confidence of knowing the technique is being performed appropriately.

Figure 7:
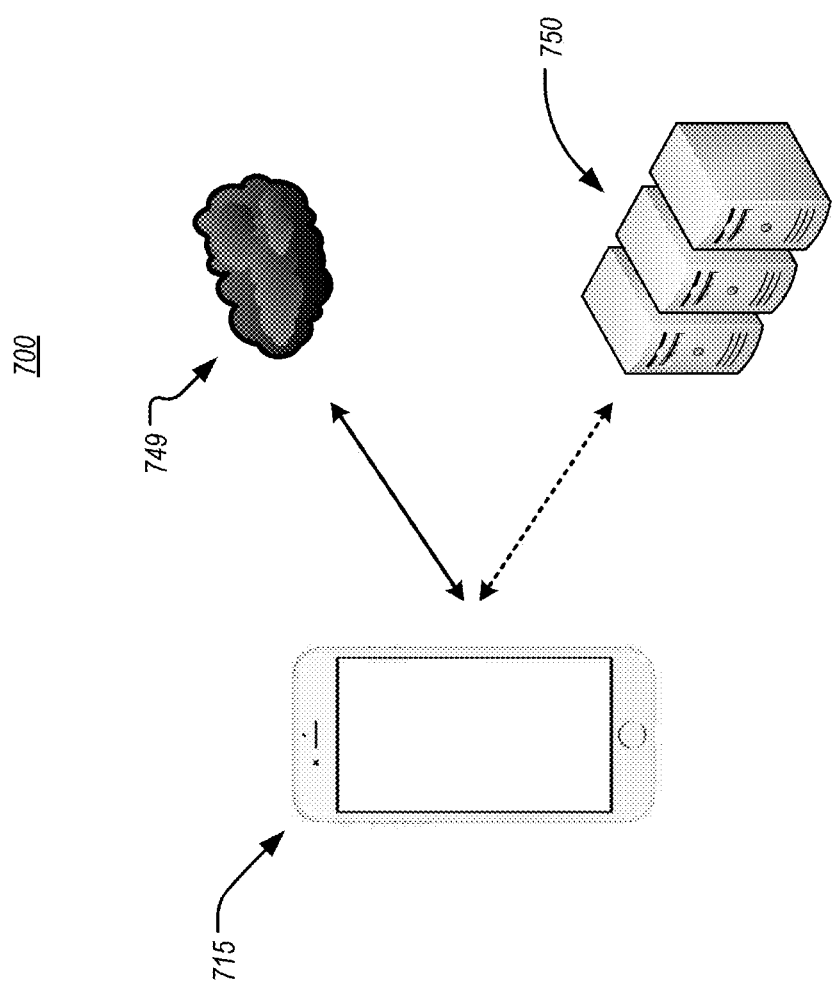
FIG. 7 illustrates the relationship between a client device and a cloud-based computing system including external servers and Internet, according to an exemplary embodiment.

FIG. 7 illustrates the relationship between a client device and a cloud-based computing system including external servers and the Internet, according to an exemplary embodiment. In an embodiment, the illustration includes an exemplary system 700 of a makeup application coaching tool. The system 700 includes at least a client device 715, or a smartphone, according to an embodiment. In an embodiment, the system 700 further includes one or more external servers 750 which are implemented as part of a cloud-computing environment and in communication with the system 700 through the Internet 749. The one or more external servers 750 can store user data, including product data related to makeup brand, cosmetic brush type, makeup compact use and color palette, as well as protocols and routines, tutorials, and other $3^{rd}$ party services, as integrated. Following completion of a coaching module, information related to available products from preferred brands may be displayed to the user via the user interface. In an embodiment, the client device-based software may also provide access to a user's social media accounts (e.g. Facebook, Twitter, Snapchat, Instagram) so that they might share their new style or look.

Further, in an embodiment, the user interface or the client device are configured to display tutorials on fundamentals of makeup application. Further, the user interface can be configured to create and download protocols for a regimen or routine. The user interface can be configured to train, track usage and compare the tracked usage to the protocol, the regimen, and the routine. Moreover, the user interface can be configured to calculate a score based on the tracked usage. The user interface can then store the scores and the tracked usage of the coaching software in the memory of the client device. Moreover, the user interface can be used to make a purchase of any products related to the makeup products registered within the client device-based software as well as recommendations of color tones, product lines, and other products related to the current style, look, or future experimental techniques.

Figure 8:
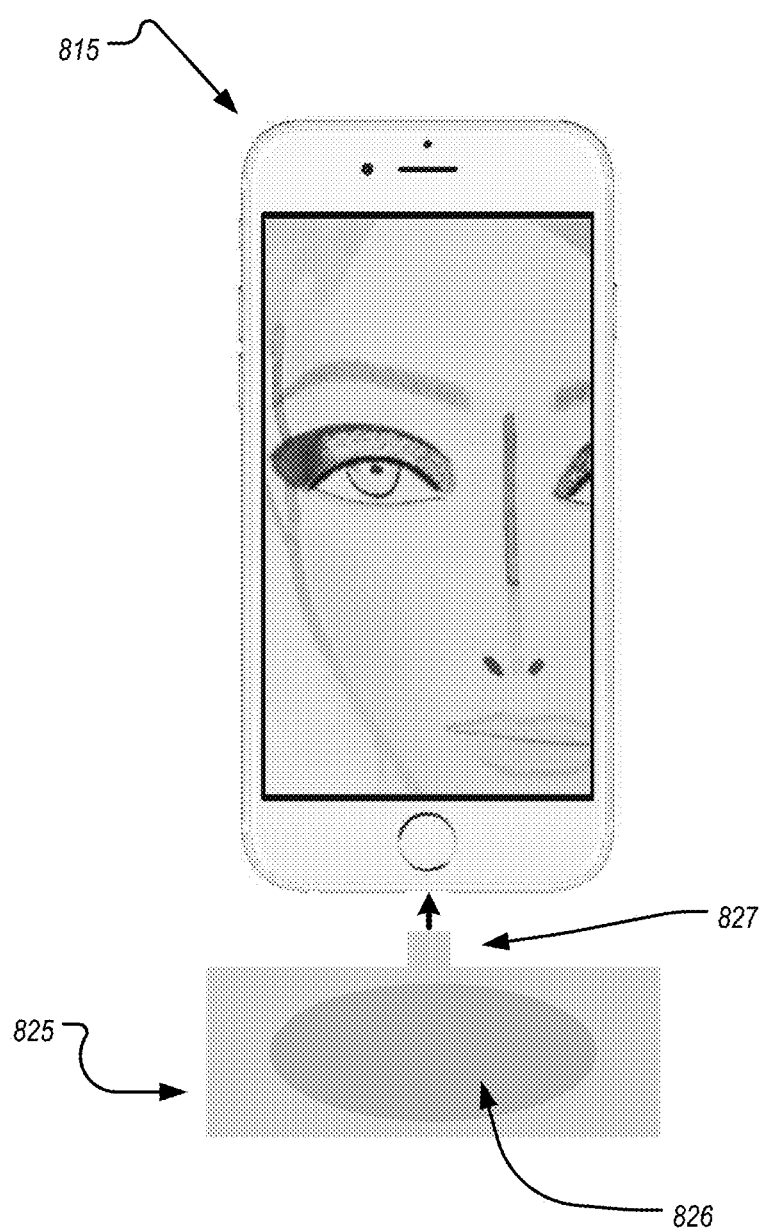
FIG. 8 is an illustration of the system, according to an exemplary embodiment of the present disclosure, wherein the makeup compact is a single makeup intended for on-the-go use and touch ups.

FIG. 8 is an illustration of the system, according to an exemplary embodiment of the present disclosure, wherein the makeup compact is a single cosmetic makeup compact intended for on-the-go use and touch ups. FIG. 8 illustrates a compact touchup kit 825 that includes one or more cosmetics meant for touchup sessions 826. In an embodiment, the compact touchup kit 825 is connected to a client device 815 via compact touchup connector 827. The client device 815 then recognizes the type of compact touchup kit 825 in use and the available cosmetics therein. Accordingly, the client device-based software proposes styles and looks based on the type of attached compact touchup kit 825, according to the abovementioned process, or allows for touchups via a mirror-like use of the client device-based software. Such electrical connection of a makeup compact to a client device is understood in the art, as evidenced by U.S. Pat. No. 9,692,864 B1, which is incorporated herein by reference.

In an embodiment, the compact touchup kit 825 is used without a semi-transparent display and client device housing. The client device 815 is employed as a display for templated shapes. In an embodiment, the compact touchup kit 825 is used with a limited coaching module functionality, wherein a style is selected (e.g. foundation) and the client-device based software generates the templated shapes appropriate for the selected style. The templated shapes generated for a single style respond similarly to the instructional units of the full coaching session, adapting to movements of the user and providing feedback where appropriate.

In an embodiment, housing for a makeup applicator is disposed within the compact touchup kit 815, creating an all-in-one system for on the go makeup application.

According to an embodiment of the present disclosure, and with reference again to FIG. 3A and FIG. 3B, FIG. 9A, FIG. 9B, and FIG. 9C describe an implementation of one or more of the front-facing sensors of the client device. Generally, FIG. 9A, FIG. 9B, and FIG. 9C describe an eye tracking feature of the present disclosure, wherein an infrared flood illuminator, an infrared camera, and a dot projector are deployed for observing eye position and eye status. Specifically, FIG. 9A, FIG. 9B, and FIG. 9C describe a detection and response method for cosmetic application instances when one eye must be closed or when a user's gaze is diverted from a semi-transparent display of a makeup compact.

It can be appreciated that, although the below processes are described relative to a single eye, these descriptions are nonlimiting and merely representative of a process applied to the left eye, the right eye, or a combination thereof. Moreover, it can be appreciated that, in addition to the infrared light described below, a variety of approaches including, for example, still images may be used in acquisition of data related to eye position and eye status.

Figure 9A:
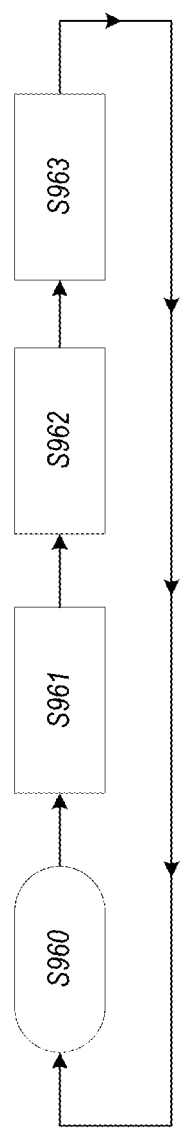
FIG. 9A is a flowchart of an aspect of an eye tracking feature of the system, according to an exemplary embodiment of the present disclosure.

According to an embodiment, FIG. 9A describes data acquisition related to the eye tracking feature of the present disclosure. First, with a user in a field of view, an infrared flood illuminator, of the front-facing sensors of a client device, illuminates the field of view with infrared light S960. A portion of the emitted infrared light is reflected from the face of the user, and the eyes of the user, specifically, and directed back toward an infrared camera of the client device S961, where it is received by the infrared camera S962. Client device-based software and processing circuitry, therein, process the received infrared data from the infrared camera and determine a metric of a characteristic of the user's eyes S963. In an embodiment, the metric of the characteristic of the user's eye is an angle at which an optical axis of the eye has shifted upon being rotated. In another embodiment, the metric of the characteristic of the user's eye is related to an eye status, the eye status being opened or closed. In an example, this metric is a value indicative of eye status. Moreover, in an embodiment, the value is an eye aperture, reflecting the position of the eyelid relative to an initial position determined during user on-boarding, as described in FIG. 6A.

According to an embodiment, the above-described process is iterative, wherein acquisition and processing of infrared data is performed continuously in order to determine subsequent metrics of characteristics of the user's eyes such that changes over time may be determined.

Figure 9B:
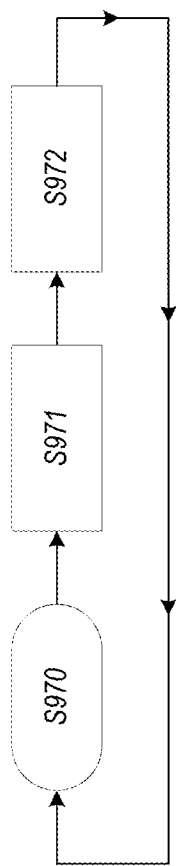
FIG. 9B is a flowchart of an aspect of an eye tracking feature of the system, according to an exemplary embodiment of the present disclosure.

FIG. 9B describes adjustment of a display projection responsive to the eye tracking feature of the present disclosure. First, with reference to the metric determination of FIG. 9A, a delta value reflecting a difference between an initial metric of a characteristic of a user's eye and a subsequent metric of the characteristic of the user's eye is determined S970. As a result, and in context of the delta value, a required movement of a displayed object is calculated S971. In an embodiment, the required movement is an adjustment of an angle of the display projection or a shift of the display projection with a plane of the display surface of the semi-transparent display. The calculated, required movement, or modification, is then performed by the client device-based software S972. In an embodiment of the present disclosure concerning a point of gaze of a user, the delta value is determined as a difference of a subsequent metric and an initial metric, wherein the delta value reflects a change in an angle of an optical axis of an eye. In an example, modification of a display projection is a reorientation of the display projection relative to the delta value. In an example, modification of a display projection is an angulation of the display projection relative to the delta value. According to an embodiment, the above-described process is iterative, wherein acquisition, processing and calculation of a delta value and a required movement are completed in real time such that changes over time may be tracked.

In embodiment, eye tracking is critical during cosmetic application tasks requiring the closure of one of the user's eyes. With normal, binocular vision, a user is able to integrate visual data received from both the left eye and the right eye, thus generating a single image from two perspectives. These two perspectives, resulting in effective depth perception within a single image, are provided by a left eye and a right eye positioned at an interpupillary distance, defined as the distance between the pupil of the left eye and the pupil of the right eye. While providing depth perception, the interpupillary distance may also result in shifted images when only one eye is available, an effect known as parallax. To this end, and as related to the present disclosure, FIG. 9C describes an implementation of the eye tracking feature of the present disclosure wherein one of the user's eyes is closed.

Initially, facial features including eye position and eye status are evaluated via the onboarding process S980, as described in FIG. 6A. This onboarding process acquires information of the position of the left eye and the right eye relative to the nose and the eye aperture of the left eye and the right eye at full aperture. In an embodiment, the client device-based software is configured to determine the left eye from the right eye and to adjust a display projection according to a changing eye status of either. Subsequent to initial metric acquisition and with reference to the metric determination of FIG. 9A, a delta value between a subsequent metric of a characteristic of a user's eye and the initial metric of the characteristic of the user's eye is determined S981. In an example, the metric of the characteristic of the user's eye reflects an eye aperture of a right eye. Therefore, by comparing the delta value to a pre-determined threshold, an evaluation of the eye aperture of the right eye is made S982. If it is determined that the delta value is less than a pre-determined threshold, no modification is made to a display projection, as the eye aperture of the right eye of the patient is sufficient for sight. If it is determined, however, that the delta value is greater than the pre-determined threshold, a modification of the display projection is made S983. According to an embodiment, the above-described process is iterative, wherein acquisition, processing, and adjusting of a display projection in response to a closed eye is performed such that changes in eye aperture are tracked in real time and user disorientation is mitigated.

Figure 9C:
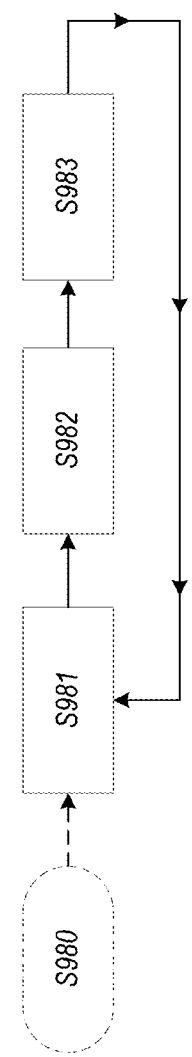
FIG. 9C is a flowchart of an aspect of an eye tracking feature of the system, according to an exemplary embodiment of the present disclosure.

According to an embodiment and as alluded to in FIG. 9C, a modification of a display projection may comprise shifting the display projection a distance corresponding to a facial feature of the user. In an embodiment, wherein a right eye of a user is closed, a display projection is shifted to the left by a pre-determined amount. In an example, wherein a left eye of a user is closed, a display projection is shifted to the right by an amount corresponding to the interpupillary distance or a scalar multiple thereof. In an example, wherein a left eye of a user is closed, a display projection is shifted to the right by an amount equivalent to half the interpupillary distance or a scalar multiple thereof.

To this end, FIG. 10A, FIG. 10B and FIG. 10C are illustrations of a user experience wherein one eye is closed. For illustrative purposes, with reference to FIG. 10A, a user is performing a cosmetic application, with both eyes open, according to a coaching module. In an example, the cosmetic application is a brow bone makeup 1092. A template 1090 provides overlay instruction to the user regarding correct application of a cosmetic to a left eye 1091. During the coaching module, it becomes necessary for the user to close the left eye 1091 in order to complete the coaching module, as shown from FIG. 10B and FIG. 10C. Traditionally, as shown in FIG. 10B, when the user closes the left eye 1091 in order to apply makeup according to the template 1090, the perceived position of the template 1090 will have shifted as the visual perspective shifts from an integrated, binocular-based position to a monocular-based position informed by only a right eye 1093. According to an embodiment of the present disclosure, however, concurrent with the above-described change in visual perception, an infrared flood illuminator and infrared camera of front-facing sensors of a client device acquire data regarding eye position and eye status. Upon the user's closing of the left eye 1090, as shown in FIG. 10C, the client device-based software determines a delta value of the eye aperture of the user, compares the delta value to a pre-determined value, and calculates a required modification of the display projection, therefrom, in order to shift the display projection on the display surface and prevent user disorientation resulting from shifting perspective-based image movements. As a result, and as shown in FIG. 10C, the left eye 1091 of the display projection, and the template 1090 therein, are shifted in order to restore the intended perceived position of the template 1090.

According to an embodiment and with reference to FIG. 1 through FIG. 6, the above described system deploys coaching modules within a makeup compact having an attached color palette, thus combining coaching and cosmetic application in an all-in-one system. It can be appreciated that, conversely, the coaching modules of the present disclosure may also be deployed independent of a makeup compact and attached color palette. To this end, FIG. 11A, FIG. 11B, FIG. 11C, FIG. 12A, and FIG. 12B describe non-limiting examples of systems for cosmetic application and coaching wherein a color palette may be independent of a client device housing and, therefore, otherwise provided.

FIG. 11A, FIG. 11B, and FIG. 11C are illustrations of a naked coaching system 1103, independent of a color palette, comprising an upper lid 1113, a semi-transparent display 1105, and a client device housing 1116 having a wall 1124.

When desired, the naked coaching system 1103 functions in a standard embodiment as a mirror, wherein the upper lid 1113 of the naked coaching system 1103 is lifted and the semi-transparent display 1105 is presented to a user. In an embodiment, the semi-transparent display 1105 is a one-way mirror. In the absence of a light-emitting client device within the client device housing 1116, the semi-transparent display 1105 functions as a standard mirror from the perspective of the user. During coaching, and following rotation of the upper lid 1113 about a flexible hinge 1112, as shown in FIG. 11B, a client device 1115 is inserted within the client device housing 1116 and a coaching module is initiated. During the coaching module, the client device 1115 projects a display object onto a projection surface 1106 of the semi-transparent display 1105. Implementation of a coaching module via the naked coaching system 1103, according to an exemplary embodiment, is performed similarly to that which is described in FIG. 5, mutatis mutandis.

FIG. 11C is a perspective view of the naked coaching system 1103, according to an exemplary embodiment of the present disclosure. An upper lid 1113 is rotated about a flexible hinge in order to expose a projection surface 1106 of a semi-transparent display. A display object, projected by a client device 1115 within a client device housing, is displayed on the projection surface 1106 and provides guidance to a user during an instructional unit of the coaching module.

In an embodiment, the semi-transparent display 1105 is fabricated such that transduction of tactile user commands to client device-based software can be performed. Examples of tactile input detection include resistance, capacitance, infrared grid, surface acoustic wave, acoustic pulse recognition, and the like, and are integrated within the client device-based software to receive user commands. According to an embodiment, a protective screen-like touch sensitive film enables tactile sensing between the client device 1115 and the semi-transparent display 1105.

In another embodiment, one or more buttons disposed through the thickness of the semi-transparent display 1105 allow direct user interaction with the client device 1115. In an embodiment, client device-based sensors detect commands from the user, including hand gestures, voice commands, and the like.

Figure 12B:
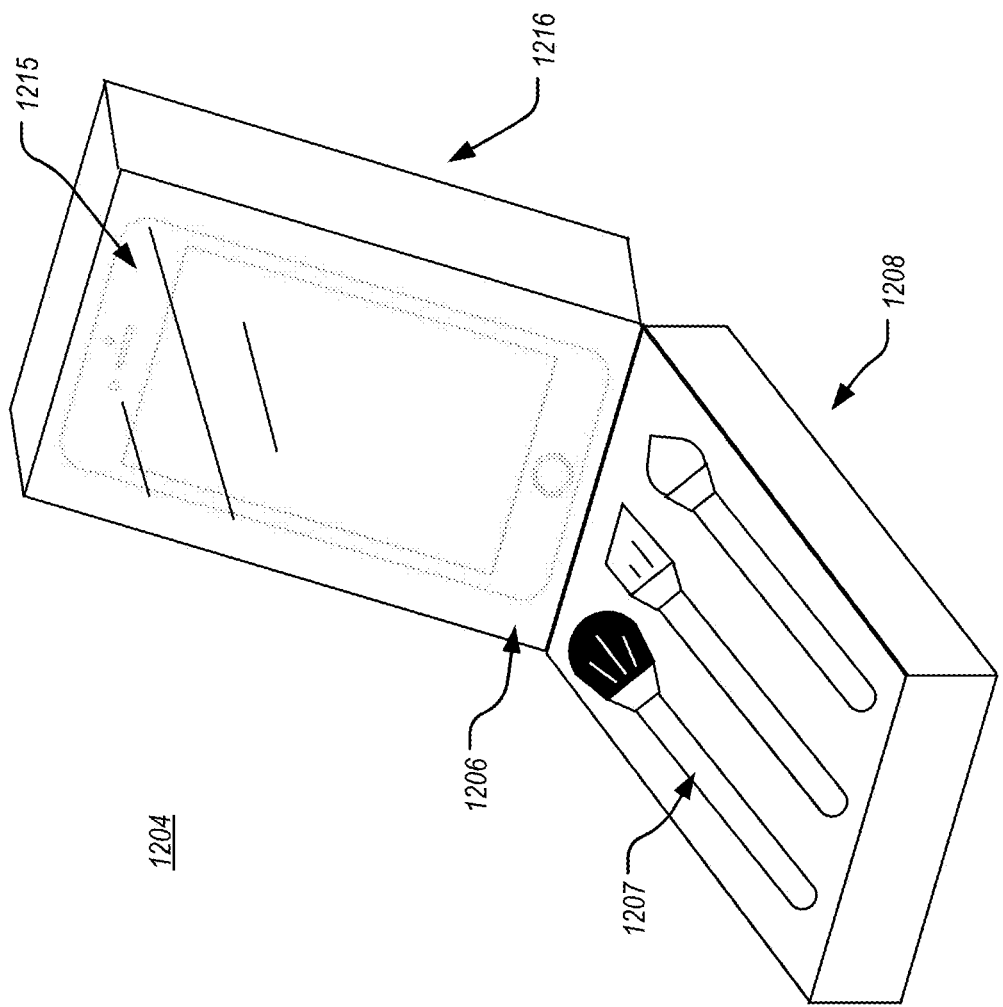
FIG. 12B is a perspective view of a brush holder coach system, according to an exemplary embodiment of the present disclosure.
Figure 12A:
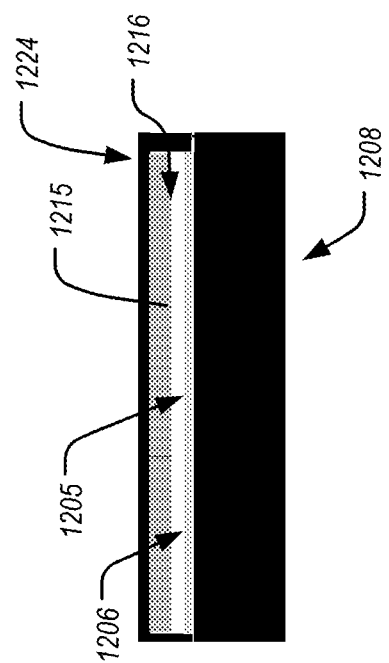
FIG. 12A is a cross-sectional schematic of a brush holder coach system, according to an exemplary embodiment of the present disclosure.

According to an embodiment, FIG. 12A, and FIG. 12B are illustrations of a brush holder coaching system 1204, independent of a color palette, comprising a semi-transparent display 1205, a brush holder 1208 configured to hold one or more brushes 1207, and a client device housing 1216 having a wall 1224.

When desired, the brush holder coaching system 1204 functions in a standard embodiment as a mirror, wherein the semi-transparent display 1205 is presented to a user. In an embodiment, the semi-transparent display 1205 is a one-way mirror. In the absence of a light-emitting client device within the client device housing 1216, the semi-transparent display 1205 functions as a standard mirror from the perspective of the user. During coaching, and following rotation of the client device housing 1216 about a flexible hinge, as shown in FIG. 12B, a client device 1215 is inserted within the client device housing 1216 and a coaching module is initiated. During the coaching module, the client device 1215 projects a display object onto a projection surface 1206 of the semi-transparent display 1205. Implementation of a coaching module via the brush holder coaching system 1204, according to an exemplary embodiment, is performed similarly to that which is described in FIG. 5, mutatis mutandis.

FIG. 12B is a perspective view of the brush holder coaching system 1204, according to an exemplary embodiment of the present disclosure. In an embodiment, a client device housing 1216 having a client device 1215 is rotated about a flexible hinge in order to expose a projection surface 1206 of a semi-transparent display. A display object, projected by the client device 1215 within the client device housing 1216, is displayed on the projection surface 1206 and provides guidance to a user during an instructional unit of the coaching module. Moreover, one or more brushes 1207 is housed within a brush holder 1208 and is utilized in conjunction with a coaching module of the client device 1215 or, independently, in conjunction with the semi-transparent display functioning as a standard mirror.

In an embodiment, the semi-transparent display 1205 is fabricated such that transduction of tactile user commands to client device-based software can be performed. Examples of tactile input detection include resistance, capacitance, infrared grid, surface acoustic wave, acoustic pulse recognition, and the like, and are integrated within the client device-based software to receive user commands. According to an embodiment, a protective screen-like touch sensitive film enables tactile sensing between the client device 1215 and the semi-transparent display 1205.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. An apparatus, comprising:
 a semi-transparent surface that is reflective on at least one side; and
 a support configured to receive a client device having a display and one or more sensors, the client device being removably-received in the support, wherein
 the semi-transparent surface overlays the display of the client device when the client device is received in the support and allows a visual object displayed on the display to be visible on the at least one reflective side of the semi-transparent surface while the at least one reflective side simultaneously shows a reflection of a user viewing the at least one reflective side, and
 the one or more sensors are configured to acquire data related to a characteristic of at least one eye of the user.

2. The apparatus according to claim 1, wherein the one or more sensors comprise an infrared camera.

3. The apparatus according to claim 1, wherein the client device further comprises a processing circuitry configured to
 determine, based upon the acquired data related to the characteristic of the at least one eye of the user, a change in the characteristic of the at least one eye of the user, and
 adjust the displayed visual object based upon the determined change.

4. The apparatus according to claim 3, wherein the change in the characteristic of the at least one eye of the user is a change in an eye aperture, the eye aperture being a metric of an openness of the at least one eye of the user.

5. The apparatus according to claim 4, wherein the displayed visual objected is adjusted based on a comparison of the determined change in the eye aperture relative to a pre-determined threshold.

6. The apparatus according to claim 3, wherein the change in the characteristic of the at least one eye of the user is a change in an eye position, the change in the eye position being a metric of an initial position of an optical axis of an eye relative to a subsequent position of the optical axis of the eye.

7. The apparatus according to claim 3, wherein the change in the characteristic of the at least one eye of the user is a change in an eye position, the change in the eye position being a metric of an optical axis of an eye relative to a sagittal axis of a head.

8. A method for adjusting a displayed visual object, comprising:
 acquiring, via processing circuitry, data related to a characteristic of at least one eye of a user; and
 adjusting, via the processing circuitry, the displayed visual object based upon the acquired data related to the characteristic of the at least one eye of the user,
 wherein the displayed visual object is displayed on a semi-transparent surface that is reflective on at least one side, the displayed visual object being visible on the at least one reflective side of the semi-transparent surface, the at least one reflective side simultaneously showing a reflection of the user viewing the at least one reflective side, and
 wherein the acquired data related to the characteristic of the at least one eye of the user is acquired via one or more sensors of a client device having a display, the client device being removably-received in a support.

9. The method according to claim 8, wherein the one or more sensors comprise an infrared camera.

10. The method according to claim 8, further comprising determining, via the processing circuitry, based upon the acquired data related to the characteristic of the at least one eye of the user, a change in the characteristic of the at least one eye of the user.

11. The method according to claim 10, wherein the change in the characteristic of the at least one eye of the user is a change in an eye aperture, the eye aperture being a metric of an openness of the at least one eye of the user.

12. The method according to claim 11, wherein the displayed visual objected is adjusted based on a comparison of the determined change in the eye aperture relative to a pre-determined threshold.

13. The method according to claim 10, wherein the change in the characteristic of the at least one eye of the user is a change in an eye position, the change in the eye position being a metric of an initial position of an optical axis of an eye relative to a subsequent position of the optical axis of the eye.

14. The method according to claim 10, wherein the change in the characteristic of the at least one eye of the user is a change in an eye position, the change in the eye position being a metric of an optical axis of an eye relative to a sagittal axis of a head.

15. A non-transitory computer-readable storage medium storing computer-readable instructions that, when executed by a computer having a processing circuitry, cause the computer to perform a method for adjusting a displayed visual object, the method for adjusting the displayed visual object comprising:

acquiring data related to a characteristic of at least one eye of a user; and adjusting the displayed visual object based upon the acquired data related to the characteristic of the at least one eye of the user, wherein the displayed visual object is displayed on a semi-transparent surface that is reflective on at least one side, the displayed visual object being visible on the at least one reflective side of the semi-transparent surface, the at least one reflective side simultaneously showing a reflection of the user viewing the at least one reflective side, and wherein the acquired data related to the characteristic of the at least one eye of the user is acquired via one or more sensors of a client device having a display, the client device being removably-received in a support.

16. The method according to claim 15, wherein the processing circuitry is further configured to determine, based upon the acquired data related to the characteristic of the at least one eye of the user, a change in the characteristic of the at least one eye of the user.

17. The method according to claim 16, wherein the change in the characteristic of the at least one eye of the user is a change in an eye aperture, the eye aperture being a metric of an openness of the at least one eye of the user.

18. The method according to claim 16, wherein the adjusting the displayed visual object is based on a comparison of the determined change in the eye aperture relative to a pre-determined threshold.

19. The method according to claim 16, wherein the change in the characteristic of the at least one eye of the user is a change in an eye position, the change in the eye position being a metric of an initial position of an optical axis of an eye relative to a subsequent position of the optical axis of the eye.

20. The method according to claim 16, wherein the change in the characteristic of the at least one eye of the user is a change in an eye position, the change in the eye position being a metric of an optical axis of an eye relative to a sagittal axis of a head.

\* \* \* \* \*